US010080142B2

United States Patent
Rico Alvarino et al.

(10) Patent No.: US 10,080,142 B2
(45) Date of Patent: Sep. 18, 2018

(54) NULL TONE TRANSMISSION IN AN UNLICENSED OR SHARED SPECTRUM

(71) Applicant: QUALCOMM Incorporated, San Diego, CA (US)

(72) Inventors: Alberto Rico Alvarino, San Diego, CA (US); Arumugam Chendamarai Kannan, San Diego, CA (US); Xiaoxia Zhang, San Diego, CA (US); Hao Xu, San Diego, CA (US); Srinivas Yerramalli, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 15/080,217

(22) Filed: Mar. 24, 2016

(65) Prior Publication Data
US 2016/0286404 A1 Sep. 29, 2016

Related U.S. Application Data

(60) Provisional application No. 62/138,875, filed on Mar. 26, 2015.

(51) Int. Cl.
*H04W 16/14* (2009.01)
*H04L 5/00* (2006.01)
(Continued)

(52) U.S. Cl.
CPC .......... *H04W 16/14* (2013.01); *H04B 17/345* (2015.01); *H04L 5/001* (2013.01);
(Continued)

(58) Field of Classification Search
CPC ......... H04L 5/0007; H04L 2012/5608; H04W 80/04; H04W 8/26; H04W 84/12; H04W 88/08; H04W 88/06; H04W 84/18
(Continued)

(56) References Cited

U.S. PATENT DOCUMENTS

2004/0166886 A1* 8/2004 Laroia ................. H04B 7/0491
455/522
2010/0214985 A1* 8/2010 Chun ................. H04L 27/2602
370/328
(Continued)

FOREIGN PATENT DOCUMENTS

WO WO-2012/020963 A2 2/2012

OTHER PUBLICATIONS

International Search Report and Written Opinion—PCT/US2016/024163—ISA/EPO—dated Jun. 21, 2016. 13 pages.

*Primary Examiner* — Brenda H Pham
(74) *Attorney, Agent, or Firm* — Arent Fox, LLP

(57) ABSTRACT

Systems, methods, and apparatuses for detecting interference caused by a wireless local area network (WLAN) and a wireless wide area network (WWAN) node operating in an unlicensed or shared spectrum is disclosed. In accordance with the present disclosure, a base station may generate a null tone pattern for one or more subframes transmitted to the UE. The null tone pattern may include one or more null tones mapped to consecutive symbols in each resource block to detect interference. Accordingly, a UE may monitor a wireless channel from a base station for a null tone transmission. The UE may detect a null tone pattern by decoding a known physical layer channel to identify the null tone pattern. In some aspects, the UE may generate channel estimates, decode allocated resources, determine timing of future transmissions and/or establish communication with the base station based on the identified null tone pattern.

18 Claims, 9 Drawing Sheets

(51) Int. Cl.
*H04L 27/00* (2006.01)
*H04B 17/345* (2015.01)

(52) U.S. Cl.
CPC ............ *H04L 5/003* (2013.01); *H04L 5/0048* (2013.01); *H04L 27/0006* (2013.01); *H04L 5/0051* (2013.01)

(58) Field of Classification Search
USPC ..... 370/208, 349, 310.2, 328, 338, 474, 471
See application file for complete search history.

(56) References Cited

U.S. PATENT DOCUMENTS

| | | | |
|---|---|---|---|
| 2010/0220651 A1* | 9/2010 | Chen .................... | H04L 5/0007 370/328 |
| 2012/0263247 A1* | 10/2012 | Bhattad ............... | H04L 25/0202 375/260 |
| 2013/0208604 A1 | 8/2013 | Lee et al. | |
| 2013/0294333 A1* | 11/2013 | Chen .................... | H04W 28/06 370/328 |
| 2015/0056931 A1* | 2/2015 | Yerramalli ............ | H04B 17/00 455/67.13 |

* cited by examiner

NULL TONE TRANSMISSION IN AN UNLICENSED OR SHARED SPECTRUM

CROSS-REFERENCE TO RELATED APPLICATION(S)

This application claims priority to U.S. Provisional Application Ser. No. 62/138,875, entitled, "NULL TONE TRANSMISSION IN AN UNLICENSED OR SHARED SPECTRUM," and filed on Mar. 26, 2015, which is assigned to the assignee hereof and hereby expressly incorporated by reference herein in its entirety.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., an LTE system).

By way of example, a wireless multiple-access communications system may include a number of base stations, each simultaneously supporting communication for multiple communication devices, which may be otherwise known as user equipment (UEs), mobile devices or stations (STAs). A base station may communicate with the communication devices on downlink channels (e.g., for transmissions from a base station to a UE) and uplink channels (e.g., for transmissions from a UE to a base station).

As cellular networks have become more congested, operators are beginning to look at ways to increase capacity. One approach may include the use of wireless local area networks (WLANs) to offload some of the traffic or signaling of a cellular network. Additionally, operators may seek to utilize unlicensed spectrum, traditionally used for WLAN, for cellular technology. But this increasing demand for unlicensed spectrum can lead to undesirable interference, which may impact certain radio access technologies (RATs) more than others.

SUMMARY

Systems, methods, and apparatuses for detecting interference caused by a WLAN and/or wireless wide area network (WWAN) node operating in an unlicensed or shared spectrum are disclosed. In accordance with the present disclosure, a base station may generate a null tone pattern for one or more subframes. The null tone pattern may include one or more null tones mapped to subcarriers within consecutive symbols in each resource block. Accordingly, a UE may monitor a wireless channel from a base station for a null tone transmission (e.g., as part of a downlink transmission or broadcast message). In some cases, the UE may detect a null tone pattern by decoding a known physical layer channel to identify the null tone pattern. In some aspects, the UE may generate channel estimates, decode allocated resources, determine the timing of future transmissions and/or establish communication with the base station based on the identified null tone pattern. Thus, in some aspects, the null tone patterns may be transmitted to at least one UE in a cell to allow the UE to detect interference caused by WLAN and/or WWAN nodes operating in the unlicensed or shared spectrum.

Aspects of the present disclosure include a method for wireless communications implemented, for example, by a base station. In some examples, the method may include determining a null tone density for at least one subframe and generating a null tone pattern for the at least one subframe based on the null tone density. The method may further include transmitting the null tone pattern to, for example, a UE.

In some aspects, an apparatus for wireless communications is also disclosed. The apparatus may include means for determining a null tone density for at least one subframe and means for generating a null tone pattern for the at least one subframe based on the null tone density. The apparatus may further include means for transmitting the null tone pattern to, for example, a UE.

In some aspect, a computer-readable medium storing code for wireless communications is disclosed. In some aspects, the code may comprise instructions executable to determine a null tone density for at least one subframe and generate a null tone pattern for the at least one subframe based on the null tone density. In some aspects, the code may further comprise instructions to transmit the null tone pattern to, for example, a UE.

In some aspects, an apparatus for wireless communications is disclosed. The apparatus may include a processor and a memory coupled to the processor. The memory may include instructions executable by the processor to determine a null tone density for at least one subframe and to generate a null tone pattern for the at least one subframe based on the null tone density. In some aspects, the instructions may further be executable to transmit the null tone pattern to, for example, a UE.

Additionally or alternatively, another method for wireless communications is disclosed that may be implemented at the UE. In some examples, the method may include decoding, at a UE, broadcast information and identifying a null tone pattern associated with at least one subframe based on the broadcast information. The method may further include communicating with the base station based on identifying the null tone pattern.

In some aspects, an apparatus for wireless communications is also disclosed. In some examples, the apparatus may comprise means for decoding, at a UE, a broadcast information and means for identifying a null tone pattern associated with at least one subframe based on the broadcast information. The apparatus may further include means for communicating with the base station based on identifying the null tone pattern.

In some aspects, another computer-readable medium for storing code for wireless communications is disclosed. In some examples, the code may comprise instructions executable to decode, at a UE, a broadcast information and identify a null tone pattern associated with at least one subframe based on the broadcast information. Additionally or alternatively, the code may further comprise instructions executable to communicate with the base station based on identifying the null tone pattern.

In some aspects, an apparatus for wireless communications is disclosed. The apparatus may include a processor and a memory coupled to the processor. The memory may include instructions executable by the processor to decode, at a UE, a broadcast information and identify a null tone pattern associated with at least one subframe based on the broadcast information. Additionally or alternatively, instructions may further be executable to communicate with the base station based on identifying the null tone pattern.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, and where a dashed line may indicate an optional component, and in which.

DETAILED DESCRIPTION

Figure 1:
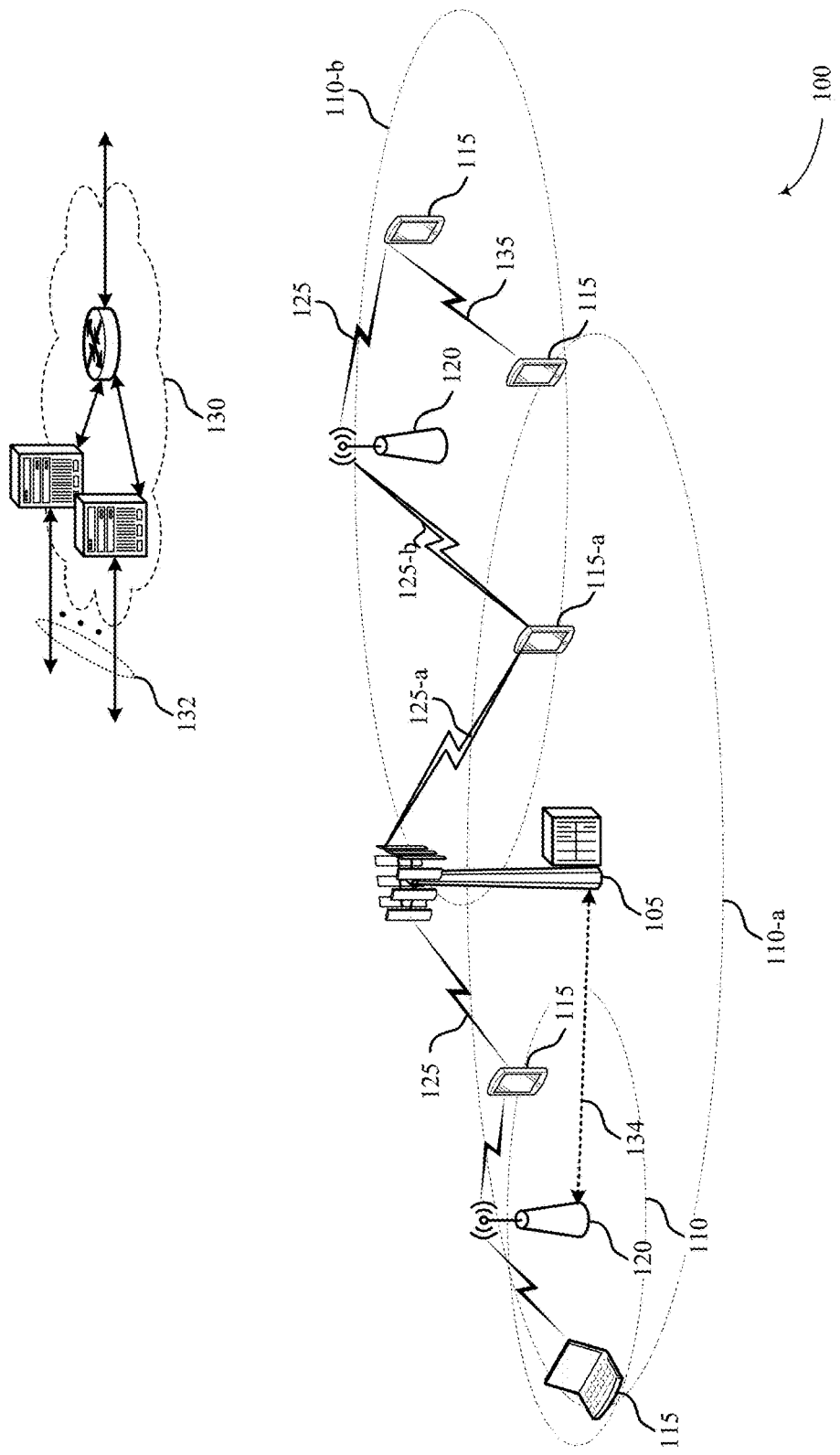
FIG. 1 illustrates an example of a wireless communications system for detecting interference caused by WLAN and/or WWAN nodes operating in an unlicensed or shared spectrum in accordance with various aspects of the present disclosure.

Various aspects are now described with reference to the drawings. In the following description, for purposes of explanation, numerous specific details are set forth to provide a thorough understanding of one or more aspects. It should be understood, however, that such aspect(s) may be practiced without these specific details.

When traffic is offloaded from a licensed radio frequency spectrum band of a cellular network (e.g., wireless wide area network (WWAN)) to an unlicensed or shared radio frequency spectrum band (e.g., band used by WLAN networks), interference between the WWAN and WLAN signals may occur. That is, due to an overlap in time or frequency resources of the WWAN and WLAN signals, for example, a signal from first network (e.g., the WLAN network) may appear as interference to a radio configured to receive signals from the second network (e.g., the WWAN network). In some aspects, a WLAN signal may impact WWAN signal on an unlicensed or shared spectrum because WLAN supports a different numerology than a WWAN. For example, symbol duration for orthogonal frequency-division multiplexing (OFDM) in WLAN signal may be 4 μs, while useful symbol duration for OFDM symbols in WWAN (e.g., LTE network) may be 66.67 μs. Also, in some examples, WLAN packets may not align with WWAN packets in time and frequency domain. Thus, while short WLAN packets (e.g., 40-120 is packets) may affect only a few symbols on WWAN signal (e.g., acknowledgment, negative acknowledgment, etc), a long WLAN packet may be asynchronous and appear as bursty interference to WWAN signal. Bursty interference may be a type of narrowband interference that may occur in a band of frequencies that are smaller or narrower than the total bandwidth of the receiver experiencing interference. In some examples, frequent bursty interference may drive the modulation and coding scheme (MCS) index value down and adversely affect the overall transmission rates experienced by devices on an unlicensed or shared spectrum.

Thus, the present disclosure provides techniques for UEs to detect interference caused by a WLAN or WWAN operating in the unlicensed or shared spectrum based on a null tone patterns generated by a base station. Aspects of the present disclosure estimate bursty interference by using null tones. In some examples, the band of interference associated with the bursty interference may be narrower than the frequency spacing between typical null tones or pilot tones in a resource block. Thus, configuring one or more null tones in accordance with one or more null tone patterns defined in the present disclosure may provide greater flexibility and coverage to detect interference (e.g., bursty interference) over a wider range of frequency band within a resource block without compromising resources that affect overall throughput.

In this disclosure, a term "null tone" may refer to a non-transmission on a time-frequency resource. Additionally or alternatively, the term "null tone density" may refer to, for example, a number density or concentration associated with how often or in how many subframes a null tone is present or used. In some examples, a term "null tone pattern" may refer to organization and mapping of a plurality of null tones in a specified order to subcarriers within OFDM symbols for one or more resource blocks. A WLAN may be a network employing techniques based on the Institute of Electrical and Electronics Engineers (IEEE) 802.11 family of standards ("Wi-Fi"). WWAN may be an example of an LTE/LTE-Advanced (LTE-A) network discussed below. Thus, the term "interference" may refer, for example, to WWAN signals and WLAN signals overlapping in at least one time or frequency resources (e.g., unlicensed or shared spectrum).

FIG. 1 illustrates an example of a wireless communications system 100 for generating null tone patterns to detect interference on an unlicensed or shared spectrum in accordance with various aspects of the present disclosure. The wireless communications system 100 includes base stations 105, access points (AP) 120, mobile devices 115, and a core network 130. In some aspects of the present disclosure, the base station 105 may be referred to as a macro cell base station, and AP 120 may be referred to as small cell base station. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 and AP 120 may perform radio configuration and scheduling for communication with the mobile devices 115, or may operate under the control of a base station controller (not shown). In various examples, the base station 105 and AP 120 may communicate, either directly or indirectly (e.g., through core network 130), with each other over backhaul links 134 (e.g., X2, Over-the-air (OTA) etc.), which may be wired or wireless communication links.

The base station 105 and AP 120 may wirelessly communicate with the mobile device 115 via one or more antennas. Each of the base station 105 and AP 120 may provide communication coverage for a respective geographic coverage area 110. In some examples, base station 105 may be referred to as a base transceiver station, a radio base station, an access point, a radio transceiver, a NodeB, eNodeB (eNB), Home NodeB, a Home eNodeB, or some other suitable terminology. The geographic coverage area 110-a for a base station 105 and coverage area 110-b for AP 120 may be divided into sectors making up only a portion of the coverage area (not shown). The wireless communications system 100 may include base station 105 and AP 120 of different types (e.g., macro or small cell base stations). There may be overlapping geographic coverage areas 110 for different technologies.

While the mobile devices 115 may communicate with each other through the base station 105 and AP 120 using communication links 125, each mobile device 115 may also communicate directly with one or more other mobile devices 115 via a direct wireless link 135. Two or more mobile devices 115 may communicate via a direct wireless link 135 when both mobile devices 115 are in the geographic coverage area 110 or when one or neither mobile device 115 is within the AP geographic coverage area 110. Examples of direct wireless links 135 may include Wi-Fi Direct connections, connections established using a Wi-Fi Tunneled Direct Link Setup (TDLS) link, and other P2P group connections. In other implementations, other peer-to-peer connections or ad hoc networks may be implemented within the wireless communications system 100.

In some examples, the wireless communications system 100 includes a wireless wide area network (WWAN) such as an LTE/LTE-Advanced (LTE-A) network. In LTE/LTE-A networks, the term evolved node B (eNB) may be generally used to describe the base stations 105, while the term user equipment (UEs) may be generally used to describe the mobile devices 115. The wireless communications system 100 may include a heterogeneous LTE/LTE-A network in which different types of eNBs provide coverage for various geographical regions. The wireless communications system 100 may, in some examples, also support a wireless local area network (WLAN). A WLAN may be a network employing techniques based on the Institute of Electrical and Electronics Engineers (IEEE) 802.11 family of standards ("Wi-Fi"). In some examples, each eNB or base station 105 and AP 120 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by mobile device 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by mobile device 115 with service subscriptions with the network provider. A femto cell may also cover a small geographic area (e.g., a home) and may provide restricted access by mobile device 115 having an association with the femto cell (e.g., mobile device 115 in a closed subscriber group (CSG), mobile device 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks (e.g., wireless communications system 100) that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a mobile device 115 and the base stations 105. The RRC protocol layer may also be used for core network 130 support of radio bearers for the user plane data. At the physical (PHY) layer, the transport channels may be mapped to physical channels.

The mobile devices 115 may be dispersed throughout the wireless communications system 100, and each mobile device 115 may be stationary or mobile. A mobile device 115 may also include or be referred to by those skilled in the art as a user equipment (UE), mobile station, a subscriber station, STA, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A mobile device 115 may be a cellular phone, a personal digital assistant (PDA), a wireless modem, a wireless communication device, a handheld device, a tablet computer, a laptop computer, a cordless phone, a wireless local loop (WLL) station, or the like. A mobile device may be able to communicate with various types of base stations and network equipment including macro eNBs, small cell eNBs, relay base stations, and the like. The mobile devices 115 may be multi-radio devices employing adaptive scanning techniques. For example, a mobile device 115 may dynamically adapt scanning operations of one of its radios based on a signal quality of another of its radios. In some examples, a dual-radio UE 115-a, may include a WLAN radio (not shown) and a WWAN radio (not shown) that may be configured to concurrently communicate with base station 105 (using the WWAN radio) and with AP 120 (using the WLAN radio).

The communication links 125 shown in wireless communications system 100 may include uplink (UL) transmissions from a mobile device 115 to a base station 105 or AP 120, or downlink (DL) transmissions, from a base station 105 or AP 120 to a mobile device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The communication links 125 may utilize resources of licensed spectrum or unlicensed spectrum, or both. Broadly speaking, the unlicensed spectrum in some jurisdictions may range from 600 Megahertz (MHz) to 6 Gigahertz (GHz), but need not be limited to that range. As used herein, the term "unlicensed spectrum" or "shared spectrum" may thus refer to industrial, scientific and medical (ISM) radio bands, irrespective of the frequency of those bands. An "unlicensed spectrum" or "shared spectrum" may refer to a spectrum used in a contention-based communications system. In some examples, unlicensed spectrum is the U-NII radio band, which may also be referred to as the 5 GHz or 5G band. By contrast, the term "licensed spectrum" or "cellular spectrum" may be used herein to refer to wireless spectrum utilized by wireless network operators under administrative license from a governing agency.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A mobile device 115 may be configured with multiple downlink CCs and one or more uplink CCs for carrier aggregation. Carrier aggregation may be used with both FDD and TDD component carriers.

Data in wireless communications system 100 may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, DTCH for dedicated UE data, and multicast traffic channel (MTCH), for multicast data. DL transport channels may include broadcast channel (BCH) for broadcast information, a DL shared channel (DL-SCH) for data transfer, paging channel (PCH) for paging information, and multicast channel (MCH) for multicast transmissions.

In accordance with the present disclosure, a base station 105 may determine a null tone density for at least one subframe and generate a null tone pattern for the at least one subframe based on the null tone density. In some examples, the null tone pattern may comprise a null tone in at least consecutive symbols in each resource block. The base station 105, upon generating a null tone pattern, may signal or transmit the null tone pattern to at least one UE (e.g., UE 115-a) over an unlicensed or shared spectrum by transmitting a broadcast message. Thus, the UE 115-a may be configured to detect, based on the null tone pattern, interference caused by a WLAN or WWAN node operating in the unlicensed or shared spectrum. A WLAN or WWAN node may refer to one of base station 105 and/or UE 115 operating in an unlicensed or shared spectrum. In some aspects, another base station 105 and/or UE 115 that is in proximity to the device (e.g., base station or UE) may be the source of interference.

Additionally or alternatively, a UE 115-a may decode the broadcast message or broadcast information received in a common search space from a base station 105 over an unlicensed or shared spectrum. The UE 115-a may identify a null tone pattern associated with at least one subframe based on the broadcast information. In some examples, the null tone pattern may be identified based on puncturing of at least one of an enhanced physical downlink control channel (ePDCCH) or physical downlink shared channel (PDSCH). Accordingly, as discussed above, the UE 115-a may be configured to detect interference caused by a WLAN or WWAN node operating in the unlicensed or shared spectrum based on the null tone pattern.

Figure 2A:
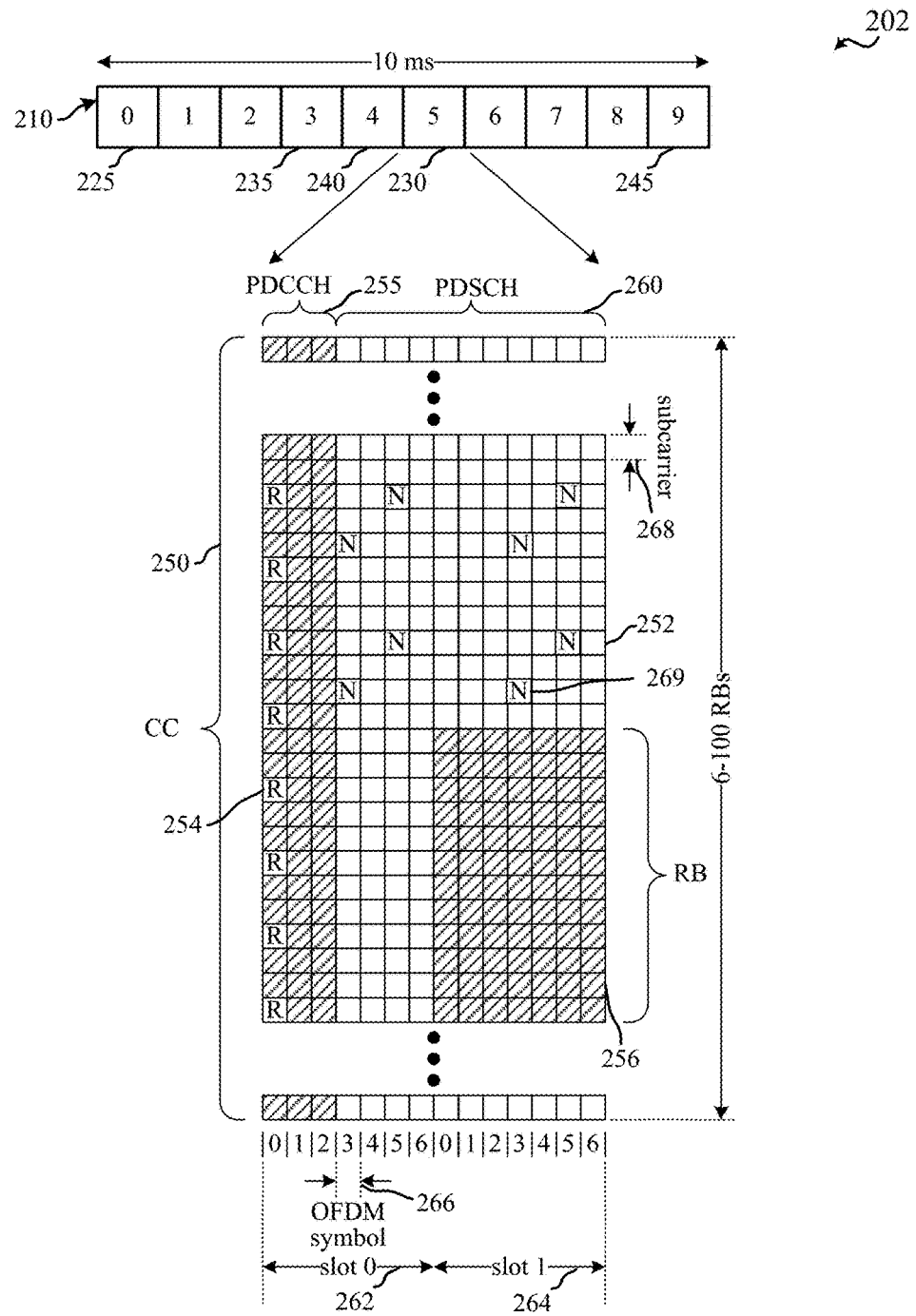
FIG. 2A is a diagram illustrating an example of a downlink frame structure that may be used in a wireless communication system over an unlicensed or shared spectrum in accordance with an aspect of the present disclosure.

FIG. 2A is a diagram illustrating an example of a downlink frame structure 202 that may be used in a wireless communication system over an unlicensed or shared spectrum, including the wireless communications system 100 described above with reference to the FIG. 1. For example, the frame structure 202 may be used in LTE/LTE-A or similar systems (e.g., systems adapted to operate in an unlicensed or shared spectrum). A frame 210 (10 ms) may be divided into 10 equally sized subframes (e.g., subframe 225, 230, 235 etc.). In some aspects of the present disclosure, one or more subframes may be configured to include null tones to aid UEs 115 in detecting interference caused by WLAN and/or WWAN nodes operating in an unlicensed or shared spectrum. The term WLAN node or WWAN node may refer to a base station 105 and/or UEs 115 operating in an unlicensed or shared spectrum.

In some examples, a subframe 230 (e.g., subframe 5 in frame 210) may include two consecutive time slots 262 and 264. An OFDMA component carrier 250 may be illustrated as a resource grid representing the two time slots 262, 264, each time slot including seven OFDM symbols 266, for a normal cyclic prefix. The resource grid may be divided into multiple resource elements 252. In LTE/LTE-A, a resource block 256 may contain 12 consecutive subcarriers 268 in the frequency domain and, for a normal cyclic prefix in each OFDM symbol 266, 7 consecutive OFDM symbols 266 in the time domain, or 84 resource elements 252. The tone spacing for subcarriers 268 may be 15 kHz, and a useful symbol duration for OFDM symbols 266 may be 66.67 µs. OFDM symbols 266 may also include a cyclic prefix that is, for a normal legacy LTE cyclic prefix, 5.1 µs for a first OFDM symbol 266 in each slot 262, 264, or 4.69 µs for other OFDM symbols 266.

Some of the resource elements, designated R (e.g., 254), may include DL reference signals (DL-RS). The DL-RS may include Cell-specific RS (CRS) (also sometimes called common RS) and UE-specific RS (UE-RS). UE-RS may be transmitted only on the resource blocks upon which the corresponding physical DL shared channel (PDSCH) 260 is mapped. The number of bits carried by each resource element may depend on the modulation scheme.

As illustrated in FIG. 2A, a physical downlink control channel (PDCCH) 255 may be time-division multiplexed with a physical downlink shared channel (PDSCH) 260 and may be fully distributed within the entire bandwidth of the component carrier 250 within a first region of first layer subframe 230. In the example illustrated in FIG. 2, PDCCH 255 takes up the first three symbols of the subframe 230. PDCCH 255 may have more or fewer symbols as is appropriate based on the component carrier bandwidth and amount of control information for the subframe 230. In some aspects, the present disclosure may incorporate enhanced physical downlink control channel (ePDCCH) to increase control channel capacity, support frequency domain inter-cell interference coordination and/or support DMRS based control channel reception. In one or more examples, ePDCCH may use PDSCH resources for control information transmission. Thus, in some examples, a set of resources in the frequency domain may be allocated for transmission of ePDCCH across a time domain for the first time slot 262 and the second time slot 264. In some examples, one or more UEs 115 in the cell may be configured with different ePDCCH configuration.

The PDCCH may carry downlink control information (DCI) in control channel elements (CCEs). The DCI may include, for example, information regarding the downlink scheduling assignments, uplink resource grants, transmission scheme, uplink power control, hybrid automatic return repeat request (HARQ) information, modulation and coding schemes (MCS) and other information. A DCI can be UE-specific (dedicated) or cell-specific (common) and placed in different dedicated and common search spaces within the PDCCH depending on the format of the DCI.

In some examples, a null tone, designated N (e.g., 269) may be mapped to one or more resource elements based on a per cell basis. A combination of one or more null tone(s) mapped to one or more resource elements in a particular order may be described as a null tone pattern (see FIGS. 2B and 2C). In some examples, a unique null tone pattern may be assigned to each cell based on cell identification (ID). For example, a first cell may be assigned a first null tone pattern, while a second cell (e.g., neighbor cell) may be assigned a second null tone pattern that may have a different number, order, and/or arrangement of null tones when compared to the first null tone pattern. In some aspects, a cell may transmit a null tone or null tone pattern associated with the cell ID to one or more UEs 115 within its coverage area. In one example, a cell may transmit a null tone to the UE 115 by failing to transmit any data or control signal in the designated null tone resource element. Alternatively, a cell may puncture or delete a portion of data or control signal mapped to the resource element to transmit a null tone. Accordingly, a UE 115 may be configured to identify the null tone pattern from the resource elements having missing data/control signals and/or punctured data/control signals in one or more downlink transmissions from the base station 105. In one or more examples, the cell may puncture resource elements reserved for ePDCCH 255 and/or PDSCH for null tone transmission. Additionally or alternatively, the cell may rate match at least one of ePDCCH or ePDSCH around the null tone pattern.

Figure 2B:
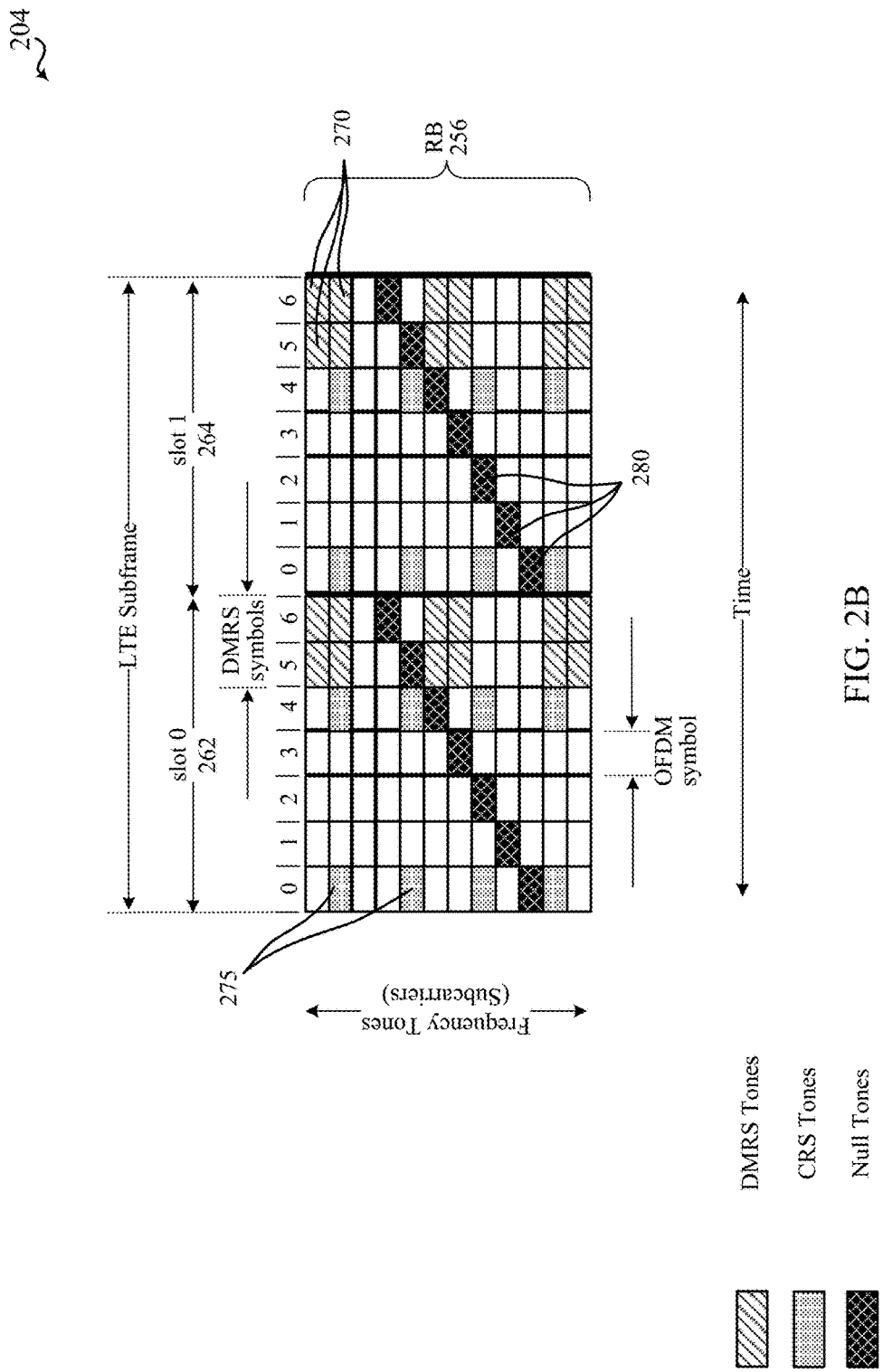
FIG. 2B illustrates one example of a subframe comprising a null tone pattern mapped to DMRS symbols in accordance with various aspects of the present disclosure.

FIG. 2B illustrates one example of a subframe 204 comprising a null tone pattern in accordance with various aspects of the present disclosure. The subframe 204 may be used for communication between a UE 115 and a base station 105 as described above with reference to FIG. 1. In some examples, the subframe 204 may be an example of LTE subframe (e.g., subframe 230) described with reference to FIG. 2A. The subframe 204 may include two consecutive time slots including slot 0 (e.g., time slot 262) and slot 1 (e.g., time slot 264). The resource grid, as discussed above, may be divided into multiple resource elements. In LTE/LTE-A, a resource block 256 may contain 12 consecutive subcarriers in the frequency domain and, 7 consecutive OFDM symbols in the time domain. FIG. 2B illustrates two consecutive resource blocks 256 in the time domain.

In some examples, the subframe 205 may include a null tone pattern 280 to detect interference caused by WLAN and/or WWAN nodes operating in an unlicensed or shared spectrum. Subframe 204 may include a null tone pattern 280 comprising one or more null tones mapped to one or more resource elements in the resource block. FIG. 2B illustrates one possible pattern for null tone transmission in a subframe 204. In some examples, a base station may determine a null tone density for at least one subframe 204. Determining the null tone density for the at least one subframe may be in response to detecting interference from a WLAN signal and/or WWAN signal on at least one OFDM symbol associated with the at least one subframe on an unlicensed or shared spectrum. Thus, in some aspects, the base station may determine the number of resource blocks that may comprise a null tone. For example, the base station may assign a null tones every K resource blocks, where K may be an integer (e.g., K=1, 2, 3, 4, etc.). Thus, if K=1, a null tone may be assigned to every resource block. Similarly, if K=2, a null tone may be assigned to every other resource block and so forth. In some examples, the null tone density may be based on type of interference experienced on the unlicensed or shared spectrum. For example, if the type of interference includes a narrowband interference spanning a small number of resource blocks (e.g., interference spanning four resource blocks), the base station may select a high tone density (e.g., K=1) signifying null tones in all resource blocks. Conversely, if the type of interference includes a wideband interference spanning a large number of resource blocks (e.g., interference spanning twenty resource blocks), the base station may select a lower density (e.g., K=4) where the null tones may be present in every four resource blocks. Accordingly, the base station may dynamically select tone density based on the type of interference (e.g., narrowband or wideband) experienced on the unlicensed or shared spectrum.

Accordingly, based on the selected null tone density, the base station 105 may generate a null tone pattern 280 that comprises a null tone in at least consecutive symbols in one or more resource blocks. In some examples, a cell specific reference signal (CRS) tone 275 and null tone pattern 280 may collide in the same resource elements. The collision may be dependent on the cell ID because the position of CRS tones 275 may be same across all resource blocks. In order to avoid collisions between the CRS tones 275 and the null tones, the base station 105, in some examples, may modify the null tone pattern 280 for a resource block by applying a vertical shift to the null tone pattern. In yet further examples, the base station 105 may identify one or more demodulation reference signals (DMRS) tones 270 mapped to one or more resource elements in the subframe 204. Based on identification of the DMRS tones 270, the base station 105 may map the null tones to avoid collision with the DMRS tones 270. In the example illustrated in FIG. 2B, the null tones may occupy or be mapped to one or more resource elements in the DMRS symbols, while avoiding the DMRS tones 270 that are part of those DRMS symbols.

Figure 2C:
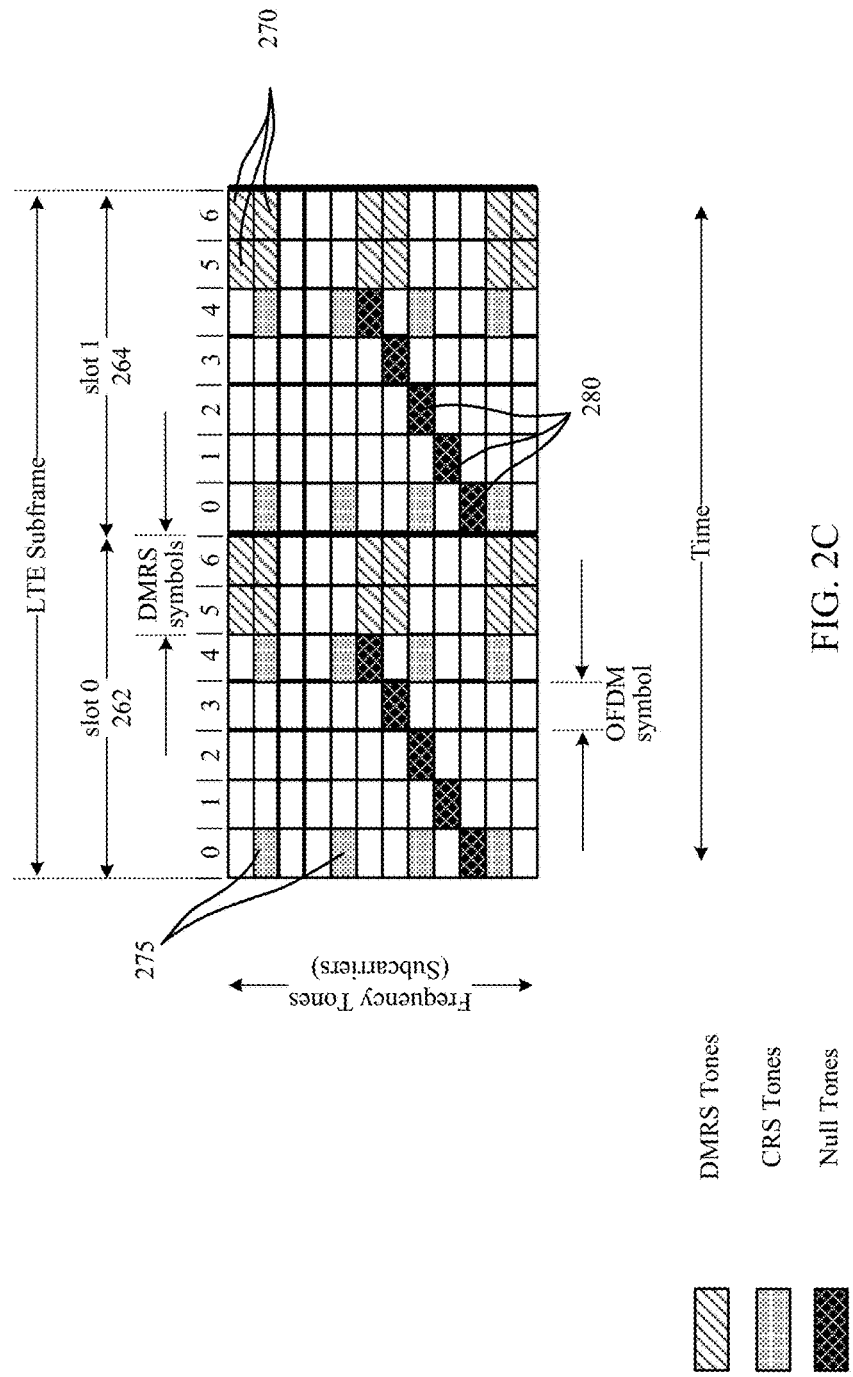
FIG. 2C illustrates an alternative example of a subframe comprising a null tone pattern that avoids DMRS symbols in accordance with various aspects of the present disclosure.

In an alternative example illustrated in FIG. 2C, a subframe 206 may comprise a null tone pattern 280 that avoids mapping one or more null tones in the symbols reserved for DMRS. Accordingly, a UE 115 may monitor a wireless channel from a base station 105 for a null tone transmission (e.g., as part of a downlink transmission). In some cases, the UE 115 may detect a null tone pattern by decoding a known physical layer channel (e.g., ePDCCH and/or ePDSCH). In other cases, UE 115 may identify the null tone pattern based on broadcast information transmitted by the base station 105. Based on the identified null tone pattern, UE 115 may generate channel estimates, decode allocated resources, or determine the timing of future transmissions and establish communication with the base station 105 based on the null tone patterns. In the example illustrated in FIG. 2C, the null tones may not occupy or be mapped to resource elements in the DMRS symbols. In this example, there are no null tones that are part of the null tone pattern in any of the resource elements associated with the DMRS symbols.

Figure 2D:
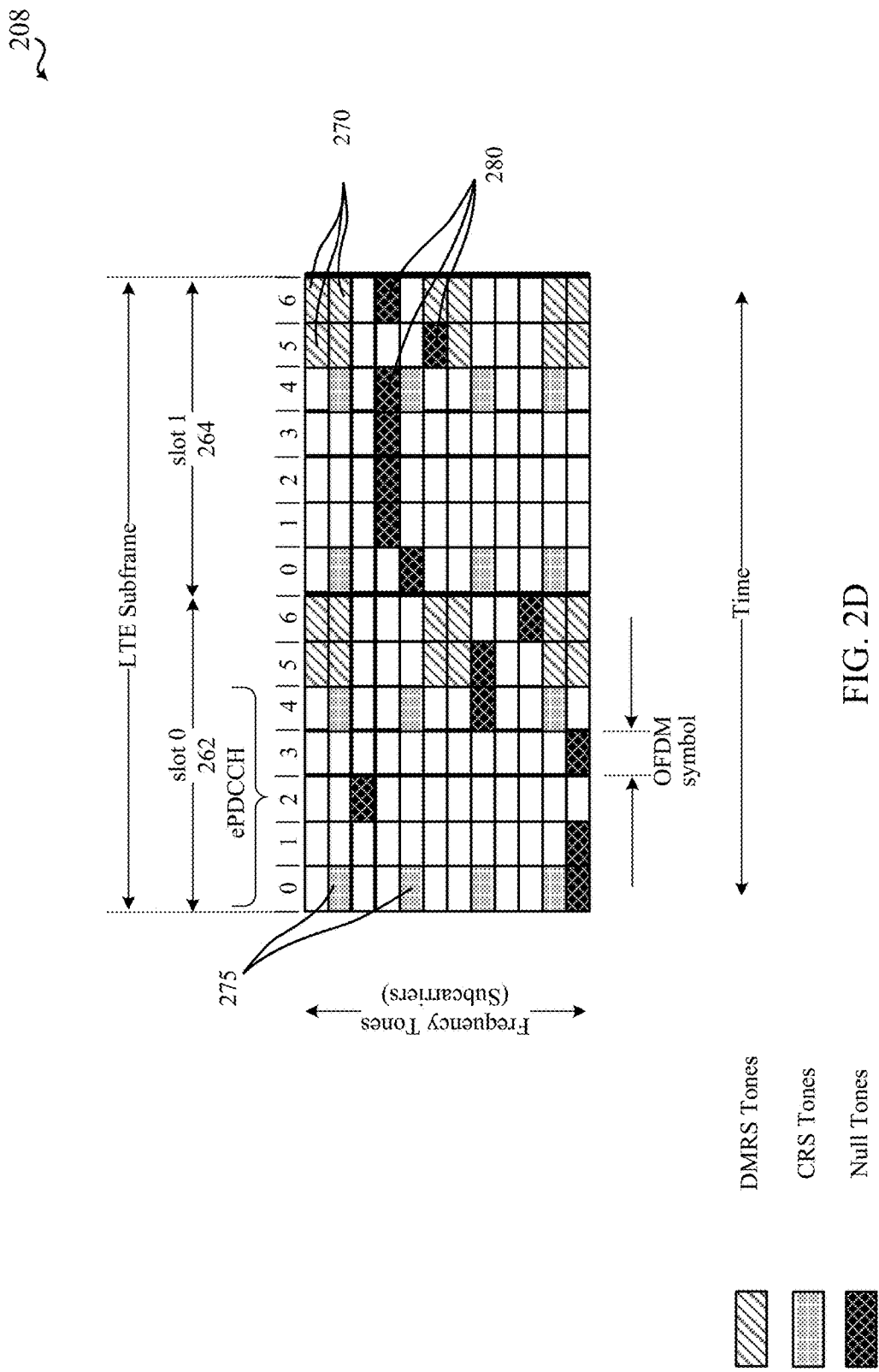
FIG. 2D illustrates an alternative example of a subframe comprising a null tone pattern that avoid collisions with one of the EPDCCH candidates.

FIG. 2D illustrates an example 208 of a null tone pattern designed to avoid collisions with one of the ePDCCH candidates. As discussed above, some aspects of the present disclosure may incorporate enhanced physical downlink control channel (ePDCCH) to increase control channel capacity, support frequency domain inter-cell interference coordination and/or support DMRS based control channel reception. In one or more examples, ePDCCH may use PDSCH resources for control information transmission. Thus, in some examples, a set of resources in the frequency domain may be allocated for transmission of ePDCCH across a time domain for the first time slot 262 and the second time slot 264. In some aspects, a common search space for ePDCCH may include different aggregation levels (e.g., maximum aggregation level 16). The location of the common search space may be broadcast or unicast to the one or more UEs.

Accordingly, in some aspects, a base station 105 may identify resource elements that may be assigned to one of the two EPDCCH candidates and select a set of resource elements for null tones 280 such that the set of resource elements includes at least one resource element per OFDM symbol and wherein all the resource elements in the set of resource elements belong to the same EPDCCH candidate as illustrated in example FIG. 2D.

Figure 3:
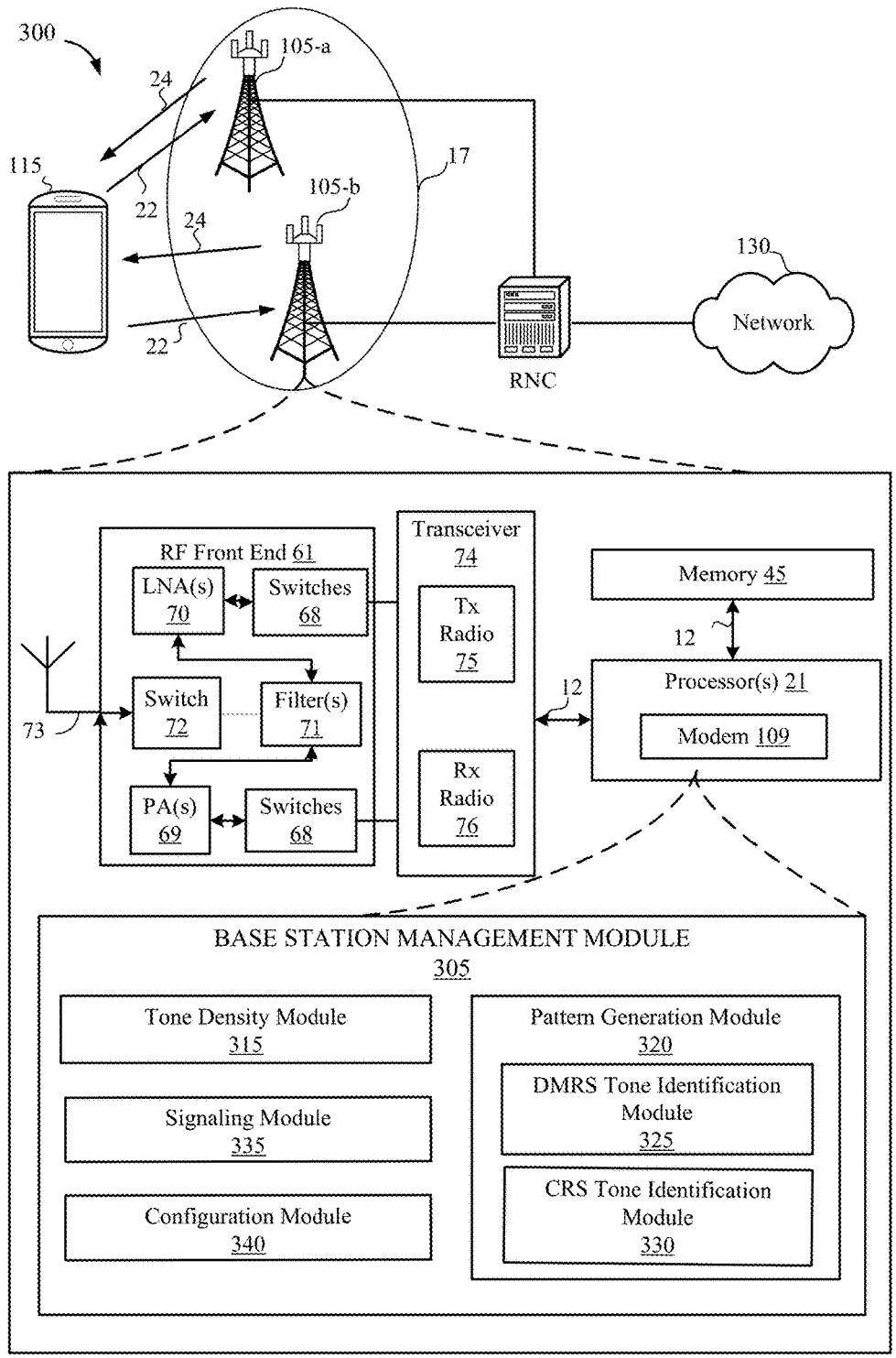
FIG. 3 illustrates an example of a schematic diagram of a communication network including aspects of base station in accordance with various aspects of the present disclosure.

Referring to FIG. 3, in an aspect, a wireless communication system 300 includes at least one UE 115 in communication coverage of at least one base station 105. The wireless communication system 300 may be an example of wireless communications system 100 described with reference to FIG. 1. Also, in some examples, the UE 115 and/or the base station 105 may be an example of UE 115 and base station 105 described with reference to FIG. 1.

In an aspect, the base station 105-*b* may include one or more processors 21 that may operate in combination a base station management component 305 configured to perform the functions, methodologies (e.g., method 500 of FIG. 5), or methods presented in the present disclosure. The one or more processors 21 may include a modem 109 that uses one or more modem processors. The various functions related to the base station management component 305 may be included in modem 109 and/or processors 21 and, in an aspect, can be executed by a single processor, while in other aspects, different ones of the functions may be executed by a combination of two or more different processors. For example, in an aspect, the one or more processors 21 may include any one or any combination of a modem processor, or a baseband processor, or a digital signal processor, or a transmit processor, or a transceiver processor associated with transceiver 74, or a system-on-chip (SoC). In particular, the one or more processors 21 may execute functions and components included in the base station management component 305.

The base station management component 305 may include a tone density component 315 for determining a null tone density for at least one subframe. In some examples, determining the null tone density for the at least one subframe may be in response to detecting interference from a wireless local area network (WLAN) signal and/or wireless wide area network (WWAN) signal on at least one orthogonal frequency-division multiplexing (OFDM) symbol associated with the at least one subframe. Thus, in some aspects, the tone density component 315 may determine the number of resource blocks that may comprise a null tone. For example, the tone density component 315 may determine that at least one null tones may be present every K resource blocks, where K may be an integer (e.g., K=1, 2, 3, 4, etc.). The null tone density may be based on identifying type of interference experienced on the unlicensed or shared spectrum. For example, if the type of interference includes a narrowband interference, the tone density component 315 may select a high tone density (e.g., K=1) signifying null tones in all resource blocks. Conversely, if the type of interference includes a wideband interference, the tone density component 315 may select a lower density (e.g., K=4) where the null tones may be present in every four resource blocks. Accordingly, the tone density component 315 may dynamically select tone density based on the type of interference (e.g., narrowband or wideband) experienced on the unlicensed or shared spectrum.

The base station management component 305 may additionally include a pattern generation component 320 configured to generate a null tone pattern for at least one subframe based on the null tone density selected by the tone density component 315. In some aspects, the null tone pattern may comprise a null tone in at least consecutive symbols in each resource block. Additionally or alternatively, generation of the null tone pattern for the at least one subframe may comprise identifying a demodulation reference signal (DMRS) tone associated with the at least one subframe and mapping the at least one null tone to avoid collision with the DMRS tone (see FIG. 2C). The method of identifying a DMRS tone associated with the at least one subframe may be performed by DMRS tone identification component 325.

In some aspects, the pattern generation component 320 may further include a CRS tone identification component 330 for identifying a cell specific reference signal (CRS)

tone associated with the at least one subframe. In some examples, CRS tones and null tones may collide in the same resource element and the collision may depend on the cell identification (ID). Because the position of the CRS tones may be same across a plurality of resource blocks, collision between the CRS tones and null tones may be avoided by modifying or changing the null tone position between resource blocks. In some examples, modifying the null tone pattern for a resource block may comprise applying a vertical shift to the null tone pattern based on identifying the position of the CRS tone.

In some examples, the base station management component 305 may additionally include a signaling component 335 for generating a signal to transmit the null tone pattern to at least one UE 115 over an unlicensed or shared spectrum. In one example, the generated signal comprising null tone pattern information may be transmitted to the UE 115 on a broadcast channel. In some aspects, the UE 115 may be configured to detect interference caused by a WLAN or WWAN operating in unlicensed or shared spectrum based on the null tone pattern. In some examples, transmitting the null tone pattern to the at least one UE 115 may comprise determining whether the null tone pattern is assigned to all RBs based on the null tone density (i.e., K=1) and scheduling a system information block (SIB) for transmission to the UE 115 upon determining that the null tone pattern is not assigned in at least some RBs. In some examples, transmitting the null tone pattern to the at least one UE 115 may comprise identifying one or more subframes that include at least one null tone and signaling to the UE 115 the one or more identified subframes. Thus, in some examples, the base station 105 may signal subframe configurations to the UE 115 by identifying whether null tones are present in all subframes or only the identified subframes.

Additionally or alternatively, the base station management component 305 may include a configuration component 340 for configuring the base station 105 for generating the null tone pattern. In some examples, the configuration component 340 may activate and/or deactivate null tone pattern generation based on detection of interference from WLAN or WWAN nodes in the unlicensed or shared spectrum. In some aspects, the configuration component 340 may determine whether the detected interference satisfies a threshold. If the configuration component 340 determines that the detected interference on the unlicensed or shared spectrum is above the threshold, the configuration component 340 may activate the null tone pattern generation in order to allow the UE 115 to detect and estimate interference caused by the WLAN and/or WWAN nodes. Alternatively, if the detected interference is below the threshold, the configuration component 340 may deactivate the null tone pattern generation.

In yet further examples, the configuration component 340 may permit at least one synchronization signal (e.g., PSS/SSS) to puncture the null tone pattern. In other examples, the configuration component 340 may rate match at least one of enhanced physical downlink control channel (ePDCCH) or a physical downlink shared channel (PDSCH) around the null tone pattern. In some aspects, the configuration component 340 may further puncture at least one of ePDCCH or PDSCH in the at least one subframe.

In some examples, the base station management component 305 and each of the sub-components may comprise hardware, firmware, and/or software and may be configured to execute code or perform instructions stored in a memory (e.g., a computer-readable storage medium). Moreover, in an aspect, the base station 105 may also include RF front end 61 and transceiver 74 for receiving and transmitting radio transmissions, for example, wireless communications (e.g., communications 22 and 24) transmitted by UE 115. For example, transceiver 74 may receive a packet transmitted by the UE 115. The base station 105, upon receipt of an entire message, may decode the message and perform a cyclic redundancy check (CRC) to determine whether the packet was received correctly. For example, transceiver 74 may communicate with modem 109 to transmit messages generated by base station management component 305 and to receive messages and forward them to base station management component 305.

RF front end 61 may be connected to one or more antennas 73 and can include one or more switches 68, one or more amplifiers (e.g., power amplifiers (PAs) 69 and/or low-noise amplifiers 70), and one or more filters 71 for transmitting and receiving RF signals on the uplink channels and downlink channels. In an aspect, components of RF front end 61 can connect with transceiver 65. Transceiver 65 may connect to one or more modems 108 and processor 20.

Transceiver 74 may be configured to transmit (e.g., via transmitter radio 75) and receive (e.g., via receiver radio 76) and wireless signals through antennas 73 via RF front end 61. In an aspect, transceiver 74 may be tuned to operate at specified frequencies such that base station 105 can communicate with, for example, UE 115. In an aspect, for example, modem 109 can configure the transceiver 74 to operate at a specified frequency and power level based on the base station configuration of the base station 105 and communication protocol used by modem.

The base station 105 may further include a memory 45, such as for storing data used herein and/or local versions of applications or base station management component 305 and/or one or more of its subcomponents being executed by processor 21. Memory 45 can include any type of computer-readable medium usable by a computer or processor 21, such as random access memory (RAM), read only memory (ROM), tapes, magnetic discs, optical discs, volatile memory, non-volatile memory, and any combination thereof. In an aspect, for example, memory 45 may be a computer-readable storage medium that stores one or more computer-executable codes defining base station management component 305 and/or one or more of its subcomponents. Additionally or alternatively, the base station 105 may include a bus 12 for coupling the RF front end 61, transmitter radio 75, memory 45 and processor 21 and to exchange signaling information between each of the components and/or subcomponents of the base station 105.

Figure 4:
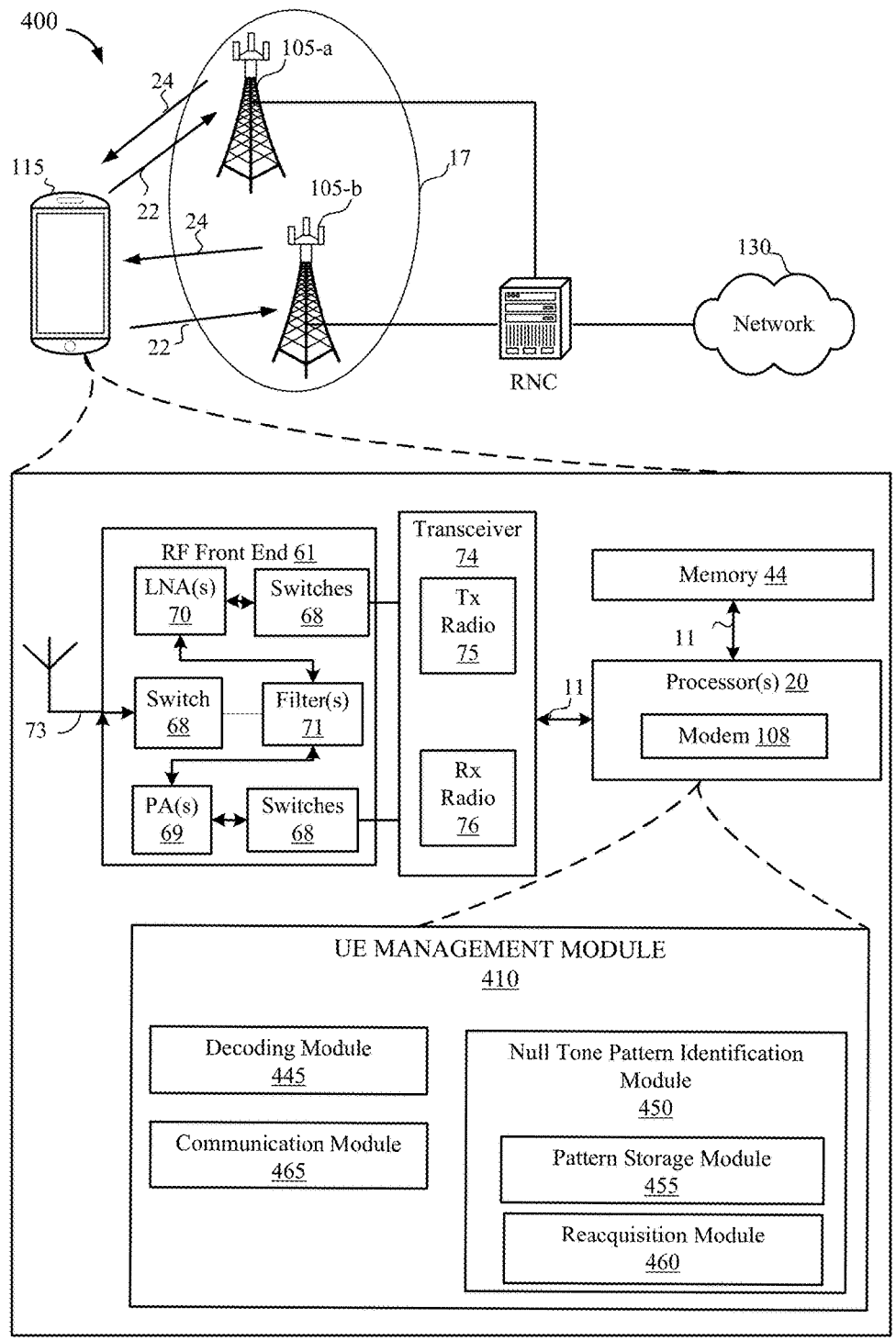
FIG. 4 illustrates an example of a schematic diagram of a communication network including aspects of the user equipment in accordance with various aspects of the present disclosure.

Referring to FIG. 4, in an aspect, a wireless communication system 400 includes at least one UE 115 in communication coverage of at least one base station 105. The wireless communication system 400 may be an example of wireless communications system 100 described with reference to FIG. 1 In some examples, the UE 115 and/or the base station 105 may be an example of UE 115 and base station 105 described with reference to FIG. 1 and FIG. 3.

In an aspect, the UE 115 may include one or more processors 20 that may operate in combination with UE management component 410 to perform the functions, methodologies (e.g., method 600 of FIG. 6), or methods presented in the present disclosure. In accordance with the present disclosure, the UE management component 410 may include a decoding component 345 for decoding, at a UE 115, broadcast information received in a common search space from a base station 105 over an unlicensed or shared spectrum. The one or more processors 20 may include a modem 108 that uses one or more modem processors. The various functions related to the UE management component 410 may be included in modem 108 and/or processor 20 and, in an aspect, can be executed by a single processor, while in other aspects, different ones of the functions may be executed by a combination of two or more different processors. For example, in an aspect, the one or more processors 20 may include any one or any combination of a modem processor, or a baseband processor, or a digital signal processor, or a transmit processor, or a transceiver processor associated with transceiver 74, or a system-on-chip (SoC). In particular, the one or more processors 20 may execute functions and components included in the UE management component 410.

In one or more aspects, the UE management component 410 may include a decoding component 445 for decoding, at a UE 115, broadcast information received in a common search space from a base station 105 over an unlicensed or shared spectrum. Based on decoding the broadcast information, a null tone pattern identification component 450 may identify a null tone pattern associated with at least one subframe. The null tone pattern may be identified based on puncturing of at least one of enhanced physical downlink control channel (ePDCCH) or a physical downlink shared channel (PDSCH). In some examples, the null tone pattern identification component 450 may be configured to detect interference caused by a WLAN or WWAN on the unlicensed or shared spectrum based on the null tone pattern transmitted by the base station 105.

The null tone pattern identification component 450 may also include a pattern storage component 455 for storing, in a memory of the UE 115, a cell ID and the corresponding null tone pattern associated with the base station 105. Thus, in some examples, the pattern storage component 455 may store in memory a set of visited cell IDs with the corresponding null tone configuration for increasing acquisition speeds during a reacquisition procedure (e.g., UE 115 reentering the coverage area of base station 105). Accordingly, the reacquisition component 460, during reacquisition, may first try to decode the information (e.g., ePDCCH/SIB) based on an assumption that no puncturing is performed, and then, if unsuccessful, identify a base station cell ID and determine that the corresponding null tone pattern associated with the base station cell ID is stored in the memory. Subsequently, the reacquisition component 460 may decode the corresponding null tone pattern to increase acquisition speed. Thus, in some examples, the UE 115 may utilize the communication component 465 to establish communication with the base station 105 over an unlicensed or shared spectrum based on identification of the null tone pattern transmitted by the base station 105.

In some examples, the UE management component 410 and each of the sub-components may comprise hardware, firmware, and/or software and may be configured to execute code or perform instructions stored in a memory (e.g., a computer-readable storage medium). Moreover, in an aspect, UE 115 may include RF front end 61 and transceiver 74 for receiving and transmitting radio transmissions, for example, wireless communications (e.g., communications 22 and 24) transmitted by base station 105. For example, transceiver 74 may receive a packet transmitted by the base station 105. UE 115, upon receipt of an entire message, may decode the message and perform a cyclic redundancy check (CRC) to determine whether the packet was received correctly. For example, transceiver 74 may communicate with modem 108 to transmit messages generated by UE management component 410 and to receive messages and forward them to the UE management component 410.

RF front end 61 may be connected to one or more antennas 73 and can include one or more switches 68, one or more amplifiers (e.g., power amplifiers (PAs) 69 and/or low-noise amplifiers 70), and one or more filters 71 for transmitting and receiving RF signals on the uplink channels and downlink channels. In an aspect, components of RF front end 61 can connect with transceiver 74. Transceiver 74 may connect to one or more modems 108 and processor 20.

Transceiver 74 may be configured to transmit (e.g., via transmitter radio 75) and receive (e.g., via receiver radio 76) and wireless signals through antennas 73 via RF front end 61. In an aspect, transceiver may be tuned to operate at specified frequencies such that UE 115 can communicate with, for example, base stations 105. In an aspect, for example, modem 108 can configure the transceiver 74 to operate at a specified frequency and power level based on the UE configuration of the UE 115 and communication protocol used by modem.

UE 115 may further include a memory 44, such as for storing data used herein and/or local versions of applications or UE management component 410 and/or one or more of its subcomponents being executed by processor 20. Memory 44 can include any type of computer-readable medium usable by a computer or processor 20, such as random access memory (RAM), read only memory (ROM), tapes, magnetic discs, optical discs, volatile memory, non-volatile memory, and any combination thereof. In an aspect, for example, memory 44 may be a computer-readable storage medium that stores one or more computer-executable codes defining waveform generation component 305 and/or one or more of its subcomponents. Additionally or alternatively, the UE 115 may include a bus 11 for coupling the RF front end 61, transceiver 74, memory 44 and processor 20 and to exchange signaling information between each of the components and/or subcomponents of the UE 115.

Figure 5:
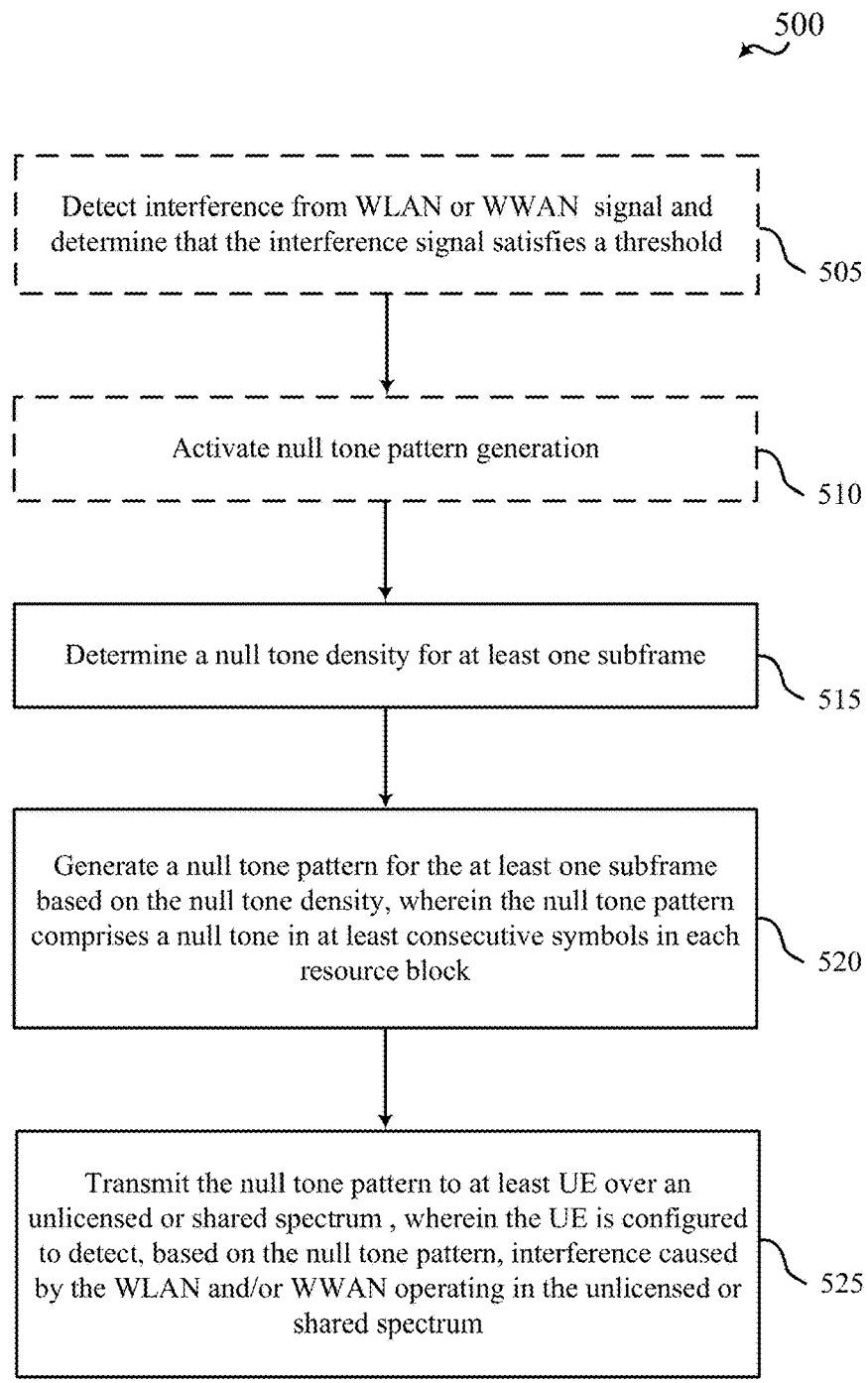
FIG. 5 illustrates an example of a flowchart that shows aspects for generating a null tone pattern in accordance with various aspects of the present disclosure.

FIG. 5 is a flowchart conceptually illustrating an example of a method 500 of wireless communication, in accordance with aspects of the present disclosure. For clarity, the method 500 is described below with reference to base station 105, which is described in, for example, FIG. 1 and FIG. 3.

At block 505, the method 500 may optionally detect interference from WLAN or WWAN signal and determine whether the interference signal satisfies a threshold. Aspects of block 505 may be performed by the configuration component 340 described with reference to FIG. 3. Additionally or alternatively, block 505 may be performed by processor 21 with instructions in memory 45, base station management component 305, and/or configuration component 340. The configuration component 340 may activate and/or deactivate null tone pattern generation based on detection of interference from WLAN or WWAN nodes in the unlicensed or shared spectrum. In some aspects, the configuration component 340 may determine whether the detected interference satisfies a threshold.

At block 510, component the method 500 may determine that the detected interference on the unlicensed or shared spectrum is above the threshold, and accordingly activate the null tone pattern generation in order to allow the UE 115 to detect and estimate interference caused by the WLAN and/or WWAN nodes. Alternatively, if the detected interference is below the threshold, the configuration component 340 may deactivate the null tone pattern generation. Additionally or alternatively, block 510 may be performed by processor 21 with instructions in memory 45, base station management component 305, and/or configuration component 340.

At block 515, the method 500 may determine a null tone density for at least one subframe. Aspects of block 515 may be performed by tone density component 315 described with reference to FIG. 3. Additionally or alternatively, block 515 may be performed by processor 21 with instructions in memory 45, base station management component 305, and/or tone density component 315. In some examples, determining the null tone density for the at least one subframe may be in response to detecting interference from a wireless local area network (WLAN) signal and/or wireless wide area network (WWAN) signal on at least one orthogonal OFDM symbol associated with the at least one subframe. Thus, as discussed above, the tone density component 315 may determine the number of resource blocks that may comprise a null tone. For example, the tone density component 315 may determine that null tones may be present in K resource blocks, where K may be an integer (e.g., K=1, 2, 3, 4, etc.). The null tone density may be based on identifying type of interference experienced on the unlicensed or shared spectrum. For example, if the type of interference includes a narrowband interference, the tone density component 315 may select a high tone density (e.g., K=1) signifying null tones in all resource blocks. Conversely, if the type of interference includes a wideband interference, the tone density component 315 may select a lower density (e.g., K=4) where the null tones may be present in every four resource blocks. Accordingly, the tone density component 315 may dynamically select tone density based on the type of interference (e.g., narrowband or wideband) experienced on the unlicensed or shared spectrum.

At block 520, the method 500 may generate a null tone pattern for the at least one subframe based on the null tone density. The null tone pattern may comprise a null tone in at least consecutive symbols in each resource block. Aspects of block 520 may be performed by pattern generation component 320 described with reference to FIG. 3. Additionally or alternatively, block 520 may be performed by processor 21 with instructions in memory 45, base station management component 305, and/or pattern generation component 320.

At block 525, the method 500 may include transmitting the null tone pattern to at least one UE over an unlicensed or shared spectrum. In some aspects, the UE may be configured to detect, based on the null tone pattern, interference caused by a WLAN or WWAN operation in the unlicensed or shared spectrum. Aspects of block 525 may be performed by signaling component 335 described with reference to FIG. 3.

In some aspects, one or more blocks (505-525) in method 500 may be performed by a corresponding means. For example, the blocks of method 500 may be performed by means of processor 21, with instructions in memory 45, base station management component 305, and/or one or more sub-components of the base station management component 305.

Figure 6:
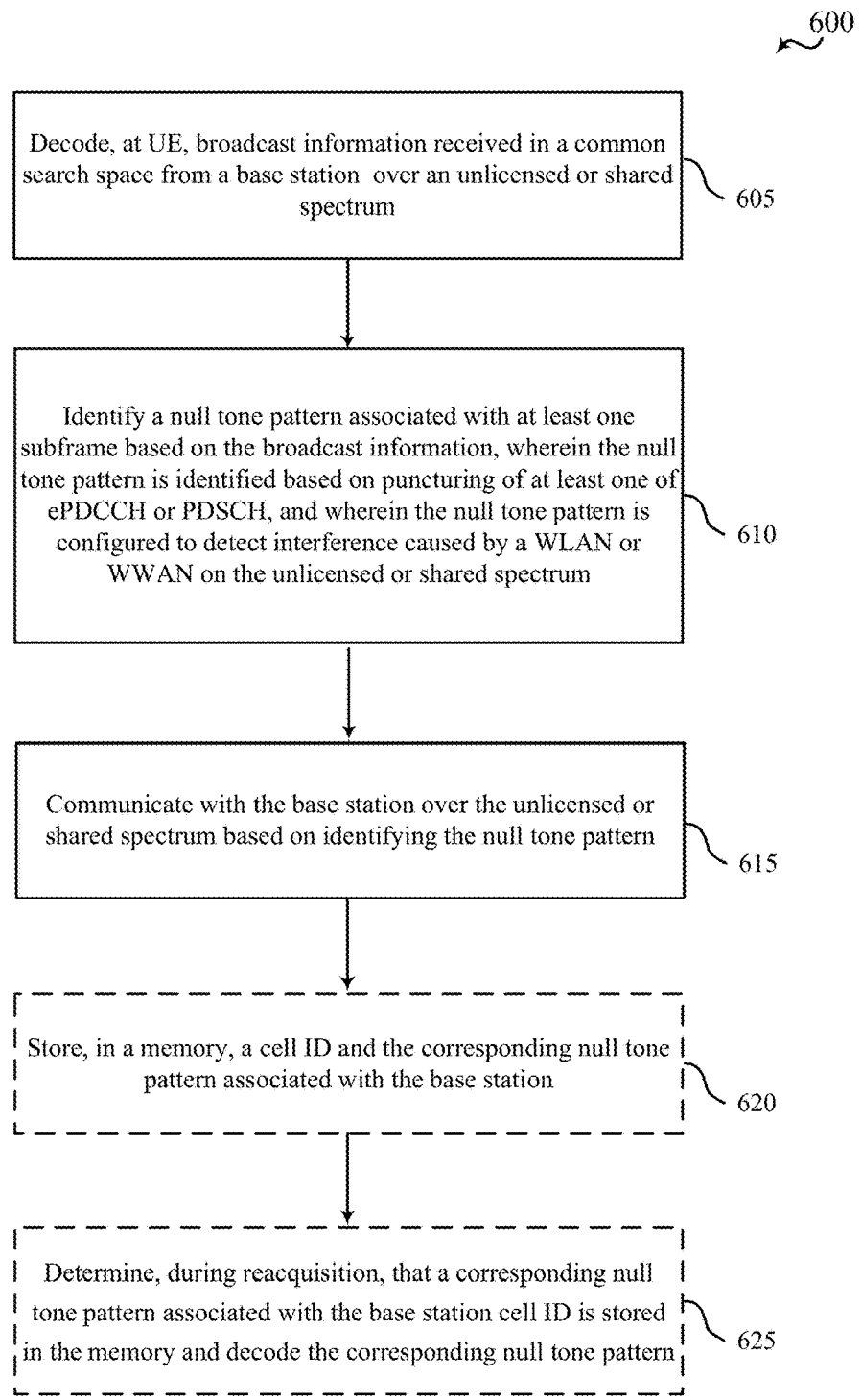
FIG. 6 illustrates an example of a flowchart that shows aspects for identifying a null tone pattern at the UE in accordance with various aspects of the present disclosure.

FIG. 6 is a flowchart conceptually illustrating an example of a method 600 of wireless communication, in accordance with aspects of the present disclosure. For clarity, the method 600 is described below with reference to UE 115, which is described in, for example, FIG. 1 and FIG. 4.

At block 605, the method 600 may include decoding broadcast information received in a common search space from a base station 105 over an unlicensed or shared spectrum. Aspects of block 605 may be performed by decoding component 445 described with reference to FIG. 4. Additionally or alternatively, block 605 may be performed by processor 20 with instructions in memory 44, UE management component 410, and/or decoding component 445.

At block 610, the method 600 may identifying a null tone pattern associated with at least one subframe based on the broadcast information, wherein the null tone pattern is identified based on puncturing of at least one of a physical downlink control channel (PDCCH) or a physical downlink shared channel (PDSCH), and wherein the null tone pattern is configured to detect interference caused by a WLAN or WWAN node on the unlicensed or shared spectrum. Aspects of block 610 may be performed by null tone pattern identification component 450. Additionally or alternatively, block 610 may be performed by processor 20 with instructions in memory 44, UE management component 410, and/or null tone pattern identification component 450.

At block 615, the method 600 may further communicating with the base station 105 over the unlicensed or shared spectrum based on identifying the null tone pattern. Aspects of block 615 may be performed by communication component 465 described with reference to FIG. 4. Additionally or alternatively, block 615 may be performed by processor 20 with instructions in memory 44, UE management component 410, and/or communication component 465.

At block 620, the method 600 may optionally further store, in a memory, a cell ID and the corresponding null tone pattern associated with the base station 105. Aspects of block 620 may be performed by pattern storage component 455 described with reference to FIG. 4. Thus, in some examples, the pattern storage component 355 may store in memory a set of visited cell IDs with the corresponding null tone configuration for increasing acquisition speeds during a reacquisition procedure (e.g., UE 115 reentering the coverage area of base station 105).

At block 625, the method 600 may optionally determine, during reacquisition, that a corresponding null tone pattern associated with the base station cell ID is stored in the memory and decode the corresponding null tone pattern. Aspects of block 625 may be performed by reacquisition component 460 described with reference to FIG. 4. Additionally or alternatively, block 610 may be performed by processor 20 with instructions in memory 44, UE management component 410, and/or reacquisition component 460.

The detailed description set forth above in connection with the appended drawings describes example embodiments and does not represent all the embodiments that may be implemented or that are within the scope of the claims. The term "exemplary," as used in this description, means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile Communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method for wireless communications, comprising:
   determining a null tone density for at least one subframe;
   generating a null tone pattern for the at least one subframe based on the null tone density; and
   transmitting the null tone pattern,
   wherein generating the null tone pattern for the at least one subframe comprises:
   identifying a demodulation reference signal (DMRS) tone associated with the at least one subframe; and
   mapping the at least one null tone to avoid collision with the DMRS tone.

2. The method of claim 1, wherein the null tone pattern comprises a null tone in at least consecutive symbols in each resource block.

3. The method of claim 1, wherein transmitting the null tone pattern comprises transmitting the null tone pattern to at least one user equipment (UE).

4. The method of claim 1, wherein transmitting the null tone pattern comprises transmitting the null tone pattern over an unlicensed or shared spectrum.

5. The method of claim 1, wherein the UE is configured to detect, based on the null tone pattern, interference caused by a wireless local area network (WLAN) or a wireless wide area network (WWAN) operating in the unlicensed or shared spectrum.

6. The method of claim 1, wherein transmitting the null tone pattern to the at least one UE comprises:

identifying one or more subframes that include at least one null tone; and
signaling to the UE the one or more identified subframes.

7. The method of claim 1, wherein transmitting the null tone pattern to the at least one UE comprises:
determining whether the null tone pattern is assigned to all resource blocks based on the null tone density; and
scheduling a system information block (SIB) upon determining that the null tone pattern is not assigned to all resource blocks, wherein the scheduling comprises transmitting the SIB in the resource blocks in which there is no null tone transmission.

8. The method of claim 1, wherein determining the null tone density for the at least one subframe and generating the null tone pattern is in response to detecting interference from a wireless local area network (WLAN) signal on at least one orthogonal frequency-division multiplexing (OFDM) symbol associated with the at least one subframe.

9. The method of claim 8, further comprising:
activating the null tone pattern generation based on detecting the interference from the WLAN signal.

10. The method of claim 1, further comprising:
permitting at least one synchronization signal to puncture the null tone pattern.

11. The method of claim 1, further comprising:
rate matching at least one of enhanced physical downlink control channel (ePDCCH) or a physical downlink shared channel (PDSCH) around the null tone pattern.

12. The method of claim 1, further comprising:
configuring the null tone pattern to be same for one or more base stations associated with a public land mobile network.

13. The method of claim 1, further comprising:
puncturing at least one of enhanced physical downlink control channel (ePDCCH) or a physical downlink shared channel (PDSCH) in the at least one subframe.

14. An apparatus for wireless communications, comprising:
means for determining a null tone density for at least one subframe;
means for generating a null tone pattern for the at least one subframe based on the null tone density; and
means for transmitting the null tone pattern,
wherein the means for generating the null tone pattern for the at least one subframe comprises:
means for identifying a demodulation reference signal (DMRS) tone associated with the at least one subframe; and
means for mapping the at least one null tone to avoid collision with the DMRS tone.

15. The apparatus of claim 14, wherein the null tone pattern comprises a null tone in at least consecutive symbols in each resource block.

16. A non-transitory computer-readable medium storing code for wireless communications, the code comprising instructions executable to:
determine a null tone density for at least one subframe;
generate a null tone pattern for the at least one subframe based on the null tone density; and
transmit the null tone pattern,
wherein the instructions executable to generating the null tone pattern for the at least one subframe further comprises instructions executable to:
identify a demodulation reference signal (DMRS) tone associated with the at least one subframe; and
map the at least one null tone to avoid collision with the DMRS tone.

17. The non-transitory computer-readable medium of claim 16, wherein the null tone pattern comprises a null tone in at least consecutive symbols in each resource block.

18. An apparatus for wireless communications, comprising:
a processor;
a memory coupled to the processor, the memory including instructions executable by the processor to:
determine a null tone density for at least one subframe;
generate a null tone pattern for the at least one subframe based on the null tone density; and
transmit the null tone pattern,
wherein generating the null tone pattern for the at least one subframe comprises:
identifying a demodulation reference signal (DMRS) tone associated with the at least one subframe; and
mapping the at least one null tone to avoid collision with the DMRS tone.

* * * * *